frames of the apparatus. A gear 82 (the shaft of which is not shown) rotatably supported by frame 81 includes a spur gear 82a and bevel gear 82b the latter of which engages with a bevel gear 84 that is rotated by the flow rate adjustment knob 68. This rotation is transmitted from bevel gear 84 to bevel gear 82b, spur gear 82a and finally to a spur gear 86a which engages with gear 82a. Spur gear 86a has a pin 86b in engagement with a slit 58c in the head of feed screw 58 so that rotation of the spur gear 86a is transmitted to the feed screw. Feed screw 58 is supported by a through-hole (not shown) provided in frame 81, and by a threaded bore 80a formed in frame 80, and includes a threaded portion 58d screwed into bore 80a; hence, feed screw 58 undergoes axial movement when rotated. Two pins 59 which engage with an annular recess 58e formed in the shank of feed screw 58 are fixed to a feed lever 88 which is adapted to rock about a feed lever supporting shaft 90 which extends through a hole provided in one end of the lever 88. The feed lever supporting shaft 90 is rotatably supported by the frame. Connecting lever 54 is rotatably supported by bearings 92, 94 connected to feed lever 88. The arm 60 is connected to and vertically extends from one end of the connecting lever 54 by means of a leaf spring 96. The leaf spring 96 is slightly bent to urge the engagement pin 60a of the arm 60 so that the engagement pin 60a is held in engagement with the groove 62a of the compensating cam 62. Connected to the other end of the connecting lever 54 is a pair of actuating shafts 98, each having at its end a ball member 98a. The ball members 98a of the actuating shafts 98 are operatively connected to and actuate flow rate adjustment valves or plungers 100. As best shown in FIG. 8, the plunger 100 comprises a cylindrical body 102 having an axial bore 102a and a transverse bore 102b formed at an upper portion of the cylindrical body 102, a biasing spring 104 disposed in the axial bore 102a, a spring seat 106 slidably received in the axial bore 102a, an adjustment screw 108 to adjust the relative position of the ball member 98a and the plunger 100, and a lock nut 110 screwed onto the adjustment screw 108. The ball member 98a of the actuating shaft 98 extends through the transverse bore 102b and is held in place between the bottom end of the adjustment screw 108 and the upper end of the spring seat 106. A flow rate adjustment valve element 108 having an slanted end 108a is mounted on the bottom end of the plunger 100. The plunger 100 thus arranged is slidably received in an axial bore 110a of a cylinder block 110 secured to the frame 80. The cylinder block 110 also has an inlet 110b formed at the bottom end of the axial bore 110a and supplied with gas under pressure, and an outlet 110c communicating with the axial bore 110a. An orifice or restrictor 112 is provided in the inlet 110b. The flow rate adjustment valve 108 is axially movable through the orifice 112, thereby varying the effective cross sectional area between the orifice 112 and the valve element 108.

Turning now to FIG. 7, the pivot shaft 64 of the compensating cam 62 is rotatably accommodated in a bore 120 formed in a cam support member 122. Support plates 124 are secured to both sides of the cam support member 122 and have bores 124a, respectively, through which a rotatable shaft 126 rotatably extend. The rotatable shaft 126 is connected to and driven by a mixing ratio adjustment knob 128 and carries thereon a cylinder cam 130 having a curved cam recess 130a with which a cam follower pin 62b formed on the compensating cam 62 engages.

With the arrangement mentioned above, the mixing ratio of two gases is determined by rotating the mixing ratio adjustment knob 128. When the knob 128 is rotated, the cylinder cam 130 is rotated together with the rotational shaft 126 connected to the knob 128. In this case, the cam follower pin 60a of the arm 60 of the connecting lever 54 moves along the cam recess 130a so that the compensating cam 62 rotates clockwise or counter-clockwise about the shaft 64 to assume a prescribed angular position. More specifically, if the knob 128 is rotated clockwise as shown by an arrow A in FIG. 7, the compensating cam 62 rotates counter-clockwise as shown by an arrow B, causing the arm 60 and accordingly the connecting lever 54 to rotate clockwise about the axis of the feed lever 88 as shown by an arrow C. Thus, the ball members 98a of the actuating shafts 98 connected to the connecting lever 54 have different levels and the first and second flow rate adjustment valves 100 have different valve openings so that the mixing ratio of the gases is determined to a prescribed ratio. Under this circumstance, if the flow rate adjustment knob 68 is rotated counter-clockwise as indicated by an arrow D, the spur gear 82a rotates clockwise as indicated by an arrow E, rotating the spur gear 86a counter-clockwise as indicated by an arrow F. In this instance, the feed screw 58 rotates counter-clockwise as shown by an arrow F. Since the thread 58d of the feed screw 58 engages with the thread 80a of the frame 80 and the pin 60 of the feed screw 58 engages with the bore formed in the feed lever 88, the counter-clockwise rotating of the feed screw 58 causes upward movement of the feed screw 58. Consequently, the connecting lever 54 is rotated clockwise about the shaft 90 as indicated by an arrow G so that both of the ball members 98a are moved upward whereby the flow rate adjustment valves 100 are moved upward to increase the total gas flow rate without causing any change in the mixing ratio of the gases controlled by the valves 100. In the embodiment shown in FIG. 7, the clockwise rotation of the knob 128 causes clockwise rotation of the connecting lever 54 so that the valve opening of the righthand side flow rate adjustment valve 100 is decreased while the valve opening of the lefthand side flow rate adjustment valve 100 is increased. Similarly, the counter-clockwise rotation of the knob 128 causes the counter-clockwise rotation of the connecting lever 54 so that the valve opening of the righthand side flow rate adjustment valve 100 is increased while the valve opening of the left-hand side flow rate adjustment valve 100 is decreased. In this manner, rotation of the mixing ratio adjustment knob is transmitted through the cylinder cam 130 and the compensating cam 62 to the connecting lever 54 which is consequently rotated about the axis of the feed lever 88, thereby determining the mixing ratio of the gases. Further, counter-clockwise rotation of the flow rate adjustment knob 68 causes clockwise rotation of the connecting lever 54 about the shaft 90 so that the flow rate adjustment valves 100 are moved upward at the same rate. On the contrary, clockwise rotation of the knob 68 causes the counter-clockwise rotation of the connecting lever 54 about the shaft 90 so that the valves 100 are moved downward. In this manner, the total flow rate of the gases is adjusted to a desired value by rotating the knob 68 in a given direction. It will be understood that the mixing ratio can be determined by rotating the mixing ratio adjustment knob 128 in a de-

U.S. Patent    Dec. 9, 1980    4,237,926
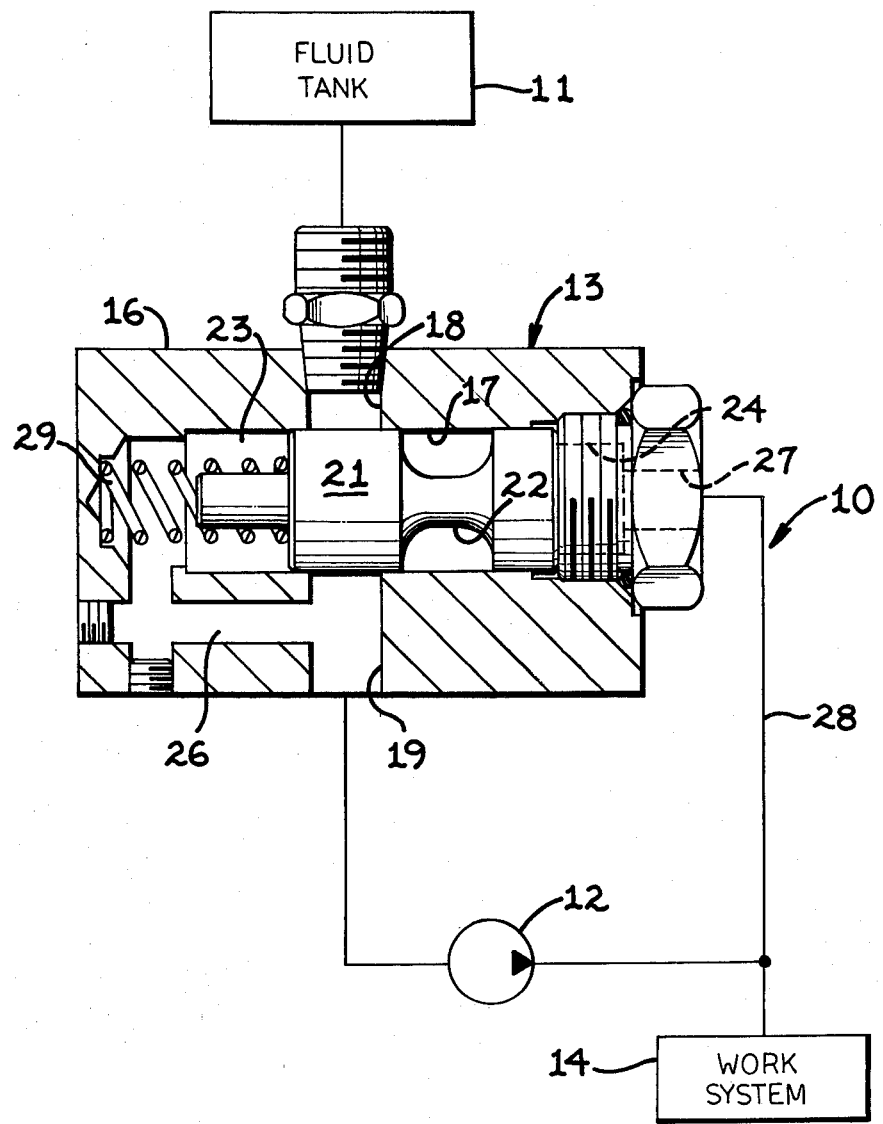

FLUID FLOW SHUTOFF VALVE

TECHNICAL FIELD

This invention relates to a shutoff valve which automatically blocks fluid flow from a fluid tank in response to the absence of any demand for fluid from the tank.

BACKGROUND ART

Many earthmoving vehicles have the fuel tank positioned higher than the engine. Thus, should a rupture or break occur in the fuel line or component of the fuel system, the fuel would be gravity fed through such rupture. In some such vehicles a solenoid valve is positioned within the fuel line and is activated in response to an electrical signal directed thereto. However, deactivating the solenoid valve to a shutoff position has heretofore been done manually and would not necessarily occur automatically. Further, a solenoid valve of a size sufficient to handle the fuel flow without restricting the fuel flow is rather costly and greatly increases the overall cost of the fuel system.

SUMMARY OF INVENTION

In one aspect of the present invention, a fuel flow shutoff valve is provided which shifts to an open position in response to a demand for fluid from the tank and automatically shifts to a closed position in response to the absence of a positive demand for fluid from the tank. Specifically, the fluid flow shutoff valve includes a valve spool slidably positioned within a bore of a body and movable between a first position at which an inlet port is blocked from communication with an outlet port and a second position at which the inlet port is in communication with the outlet port. A passage connects the outlet port to a first chamber positioned at one end of the spool while a pressure port is connected to a second chamber at the opposite end of the valve spool. A spring resiliently urges the valve spool to the first position and has sufficient resiliency to be overcome by the force exerted on the valve spool in response to a partial vacuum being created in the first chamber.

BRIEF DISCRIPTION OF THE DRAWING

The sole FIGURE is a diagrammatic sectional view of an embodiment of the present invention depicted in a fluid system.

BEST MODE FOR CARRYING OUT THE INVENTION

Referring to the drawing a fluid system is generally indicated by the reference numeral 10 and includes a fluid tank 11, a pump 12 connected to draw fluid from the tank 11, a fluid flow shutoff valve 13 positioned between the fluid tank 11 and the intake of pump 12, and a work system 14 connected to the discharge side of pump 12. In one example the work system 14 can be a fuel system for delivering fuel to an engine and fluid tank 11 can be a fuel tank for supplying fuel to the fuel system.

The fuel flow shutoff valve 13 includes a body 16 having a bore 17 and an inlet port 18 and an outlet port 19 communicating with the bore. The inlet port 18 is connected to fluid tank 11 and outlet port 19 is connected to the intake side of pump 12.

A valve spool 21 is slidably positioned within bore 17 and has an annular groove 22 provided thereon. Valve spool 21 is movable between a first position at which inlet port 18 is blocked from communication with outlet port 19 by valve spool 21 and a second position at which inlet port 18 is in communication with outlet port 19 via annular groove 22.

First and second chambers 23,24 are provided in bore 17 at opposite ends of valve spool 21. A passage 26 connects outlet port 19 to first chamber 23. A pressure port 27 is connected to second chamber 24 and to a pilot line 28 connected to the discharge or pressure side of pump 12 between pump 12 and work system 14.

A means, for example, a compression spring 29 positioned within first chamber 23 is provided for resiliently urging valve spool 21 to the first position. Compression spring 29 has sufficient resiliency to be overcome by the force exerted on valve spool 21 in response to a partial vacuum of a preselected value being created in first chamber 23 by pump 12.

INDUSTRIAL APPLICABILITY

In use when pump 12 is not being driven, valve spool 21 will be resiliently urged to the first position as shown in the drawing by spring 29. Upon starting the pump 12, since the pump is initially blocked from drawing fluid from fluid tank 11 by valve spool 21, a partial vacuum is created in outlet port 19, passage 26, and first chamber 23. The partial vacuum in first chamber 23 causes a force to be exerted on valve spool 21 and when the vacuum reaches a preselected value the force acting on the valve spool overcomes the resiliency of spring 29 causing valve spool 21 to be moved to the second position. At the second position of valve spool 21, fluid is drawn from fluid tank 11 by pump 12 and directed to work system 14. The pressurized fluid is also delivered through pilot line 28, pressure port 27 and into second chamber 24 where it then holds valve spool 21 at the second position as long as pump 12 is driven. When pump 12 is stopped, such that there is no positive demand for fluid by the pump and hence no pressurized fluid being delivered to chamber 24, spring 29 will automatically return valve spool 21 to the first position again blocking fluid flow from fluid tank 11.

Thus, from the foregoing it is readily apparent that the shutoff valve will operate automatically to stop fluid flow from fluid tank 11 in response to an absence of a positive demand for fluid from the tank. Moreover, the shutoff valve is of simple construction and can be manufactured in convenient sizes economically.

What is claimed is:

1. A fluid flow shutoff valve (13) for positioning within a fluid system (10) having a fluid tank (11) and a pump (12), comprising:

a body (16) having a bore (17) and an inlet port (18) and an outlet port (19) in communication with said bore (17);

a valve spool (21) slidably positioned within the bore (17) and movable between a first position at which the inlet port (18) is blocked from communication with the outlet port (19) and a second position at which the inlet port (18) is in communication with outlet port (19);

said valve spool (21) and said body (16) defining first and second chambers (23,24) at opposite ends of said valve spool;

a passage (26) connecting the outlet port (19) to the first chamber (23);

a pressure port (27) connected to the second chamber (24);

a spring (29) positioned within the first chamber (23) and resiliently urging the valve spool (21) to the first position, said spring (29) having sufficient resiliency to be overcome by the force exerted on the valve spool (21) in response to a partial vacuum being created in said first chamber (23); and wherein said inlet port (18) is connected to said fluid tank (11) and said outlet port (19) is connected to the pump (12) and including means (28) for directing pressurized fluid from the pump (12) to the pressure port (27) and hence into second chamber (24).

2. A fluid system (10) comprising:

a fluid tank (11);

a work system (14);

a fluid pump (12) having an intake side connected to said fluid tank (11) and its discharge side connected to said work system (14);

a shutoff valve (13) positioned between said fluid tank (11) and said fluid pump (12), said shutoff valve (13) including a body (16) having a bore (17), an inlet port (18) connecting the bore (17) to said fluid tank (11), an outlet port (19) connecting the bore (17) to the intake side of said pump (12), a valve spool (21) slidably positioned within the bore (17) and movable between a first position at which the inlet port (18) is blocked from communication with the outlet port (19) and a second position at which the inlet port (18) is in communication with the outlet port (19), a spring (29) connected to said valve spool and resiliently urging the valve spool to the first position, first and second chambers (23,24) positioned at opposite ends of the valve spool (21), a passage (26) connecting the outlet port (19) to the first chamber (23), and a pressure port (27) connected to the second chamber; and means (28) for connecting the discharge side of said pump (12) to said pressure port (27).

* * * * *